United States Patent [19]

Taguchi et al.

[11] Patent Number: 4,672,638
[45] Date of Patent: Jun. 9, 1987

[54] MULTIPATH CANCELLER FOR CANCELLING A DISTORTION CAUSED TO A RADIO FREQUENCY PULSE BY MULTIPATH TRANSMISSION

[75] Inventors: Tetsu Taguchi; Tatsukichi Koshio, both of Tokyo, Japan

[73] Assignee: NEC Corporation, Tokyo, Japan

[21] Appl. No.: 663,710

[22] Filed: Oct. 22, 1984

[30] Foreign Application Priority Data

Oct. 24, 1983 [JP] Japan .................................. 58-198609
Nov. 9, 1983 [JP] Japan .................................. 58-210341
Nov. 11, 1983 [JP] Japan .................................. 58-205246

[51] Int. Cl.⁴ ............................................. H04B 1/10
[52] U.S. Cl. ...................................... 375/99; 375/102;
                                                 328/164; 455/65; 455/303
[58] Field of Search ................. 455/65, 303, 304, 295,
         455/297, 63, 52; 375/58, 99, 100, 102; 328/164

[56] References Cited

U.S. PATENT DOCUMENTS

3,378,847 10/1984 Grover et al. ........................ 375/102
3,566,274  2/1971 Di Toro .............................. 455/303
4,481,645 11/1984 Karabinis ............................. 375/99

Primary Examiner—Robert L. Griffin
Assistant Examiner—M. Huseman
Attorney, Agent, or Firm—Schwartz, Jeffery, Schwaab, Mack, Blumenthal & Evans

[57] ABSTRACT

For use in cancelling a distortion caused by multipath transmission to an original radio frequency pulse of an original pulse shape, a multipath canceller comprises a priliminary circuit for producing a distortionless pulse of the original pulse shape and a distortion cancelling circuit responsive to the distortionless pulse and each distorted pulse having the distortion for producing a distortion cancelled pulse at a correct pulse position which the original pulse would have if received through a direct path alone. The preliminary circuit may comprise a memory for the distortionless pulse. The distortion cancelling circuit may comprise an envelope detector for envelope detecting the distorted pulse to produce a detected pulse, a composer for composing the distortionless pulse with different amplitudes and pulse positions repeatedly into a composite pulse approximating the detected pulse, and a generator for generating the distortion cancelled pulse by using the distortionless pulse and a pulse position of one of the composite pulses that has an earliest occurrence. Alternatively, the preliminary circuit may comprise DFT and IDFT circuits for processing the distorted pulse into the distortionless pulse. The distortion cancelling circuit may comprise a cross-correlator for the distorted and the distortionless pulses and an autocorrelator for the distortionless pulse.

13 Claims, 23 Drawing Figures

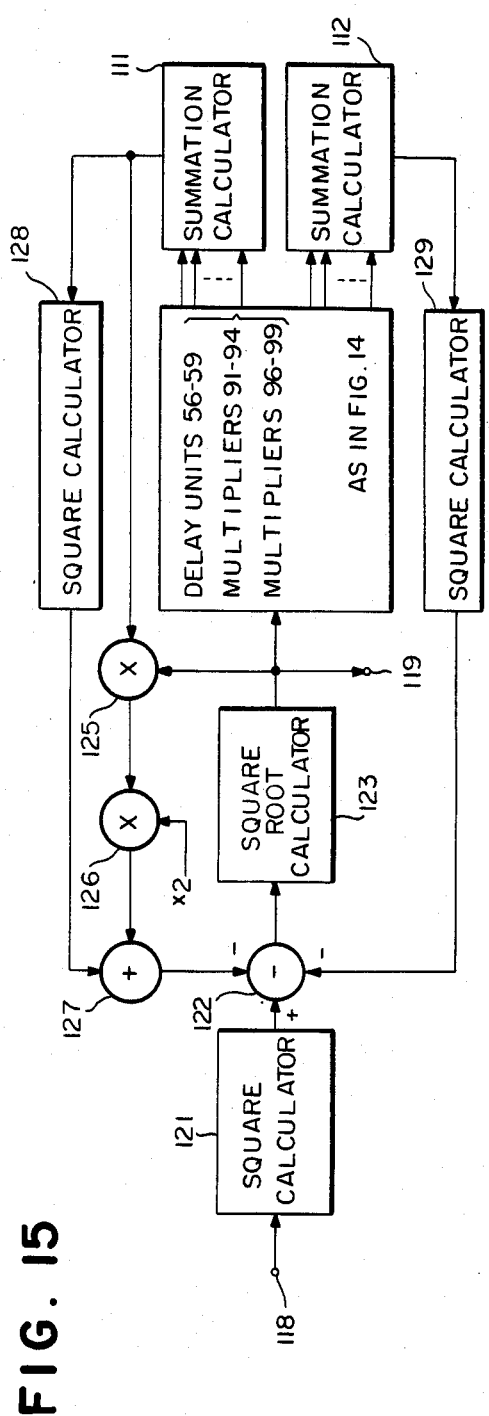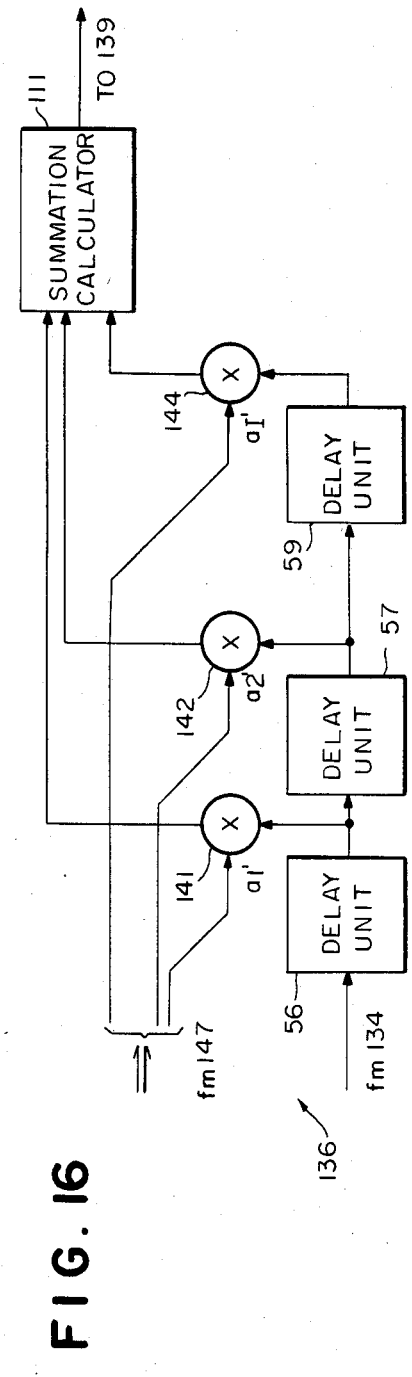
FIG. 15
FIG. 16

MULTIPATH CANCELLER FOR CANCELLING A DISTORTION CAUSED TO A RADIO FREQUENCY PULSE BY MULTIPATH TRANSMISSION

BACKGROUND OF THE INVENTION

This invention relates to a multipath canceller for use in cancelling a distortion to which a pulse amplitude modulated radio frequency signal is subjected as a result of transmission through a plurality of transmission paths.

As will later be described more in detail, a vehicle active or a vehicle passive radio navigation system comprises an interrogator and a transponder. Each of the interrogator and the transponder comprises a transmitter and a receiver. A typical one of the radio navigation systems is TACAN/DME, namely, a distance measuring equipment (DME) of a tactical air navigation system which is generally known as a TACAN system. The interrogator transmits a pulse amplitude modulated radio frequency signal to the transponder as an interrogation signal. Responsive to the interrogation signal, the transponder transmits another pulse amplitude modulated signal back to the interrogator as a response signal. The interrogation and the response signals are usually in different radio frequency bands.

Such a pulse amplitude modulated radio frequency signal is produced by amplitude modulating a carrier signal of a radio frequency by a modulating pulse into an original radio frequency pulse of an original pulse shape. Preferably, the original pulse shape has a distribution of instantaneous amplitudes substantially according to the Gaussian or normal distribution known in statistics. The original pulse shape has a finite pulse duration or width as will later be described more in detail.

The original radio frequency pulse is received at the transponder or the interrogator inevitably through a plurality of transmission paths due to topographic and other influences. In other words, the radio frequency pulse is unavoidably subjected to multipath transmission. One of the transmission paths is a shortest or direct path. Others of the transmission paths are undesired paths. The multipath transmission gives a distortion to the original pulse shape during transmission of the radio frequency pulse through the transmission paths, namely, before reception of the radio frequency signal. A distorted radio frequency pulse of a distorted pulse shape is therefore received at the transponder or the interrogator. The distorted radio frequency pulse has a longer pulse duration than the finite pulse duration and is therefore placed at a distorted pulse position which is different from a correct pulse position which the original radio frequency pulse would have if received through the shortest path alone.

It is possible to understand that the distortion is caused in the original radio frequency pulse received through the shortest path by the original radio frequency pulse received through the undesired paths. The distortion varies depending on the undesired paths. It is therefore desirable in carrying out measurements by the radio navigation system to preliminarily cancel the distortion from the distorted radio frequency pulse to produce a distortionless pulse at the correct pulse position as a distortion cancelled pulse. Otherwise, the distortion results produce various defects. By way of example, the distortion gives rise to errors in the measurements. For an aircraft approaching an airport, the error would result in grave consequences.

It is usual in a radio navigation system to use a sequence of pulse pairs or twin pulses as the modulating pulse. Each pulse pair consists of a first and a second modulating pulse in succession. The first and the second modulating pulses have the original pulse shape in common. A first and a second original radio frequency pulse are subjected to the multipath transmission. Such a radio frequency pulse pair is used in order to facilitate discrimination of the radio frequency signal used in the radio navigation system from other radio frequency signals or electromagnetic waves used in other systems. It is possible in connection with the radio frequency pulse pair to classify the undesired paths into near and distant paths which are near to the shortest path and distant therefrom, respectively. More particularly, the classification is based on the following facts. The first and the second original radio frequency pulses received through the shortest path, are distorted by the first and the second original radio frequency pulses, respectively, which are received through the near paths. The second original radio frequency pulse received through the shortest path, is distorted by the first original radio frequency pulse received through the distant paths. In this manner, the first and the second original radio frequency pulses are received as a first and a second distorted pulse of a first and a second distorted pulse shape, respectively. The first and the second distorted pulses have a first and a second distorted pulse position, respectively. In practice, a composite distortion results in the second distorted pulse as a result of reception of the radio frequency pulse pair through the shortest path, near paths, and distant paths.

The multipath transmission is similar in effect to echoes in a long-distance telephone network as, for example, in an international telephone network. An echo canceller is used in such a long-distance telephone network. The echo canceller is for use in cancelling the echoes by resorting to digital signal processing techniques in estimating the echoes. Although the situation is similar, it is impossible in practice to apply the principles of operation of the echo canceller to the multipath canceller. This is because a high frequency of the order of 1 GHz is used as the radio frequency in the radio navigation system. On resorting to the digital signal processing techniques, as high a sampling frequency as about 2 GHz or more must be used according to the Nyquist theorem. This high sampling frequency is impractical.

SUMMARY OF THE INVENTION

It is therefore an object of the present invention to provide a multipath canceller for use in a radio navigation system in cancelling a distortion which is caused in each radio frequency pulse of a pulse amplitude modulated radio frequency signal before reception of the radio frequency pulse.

It is another object of this invention to provide a multipath canceller of the type described, which is for use in avoiding errors in measurements carried out by the system.

Other objects of this invention will become clear as the description proceeds.

According to an aspect of this invention, there is provided a multipath canceller responsive to each distorted pulse of a pulse amplitude modulated radio frequency signal received through a plurality of transmission paths comprising a shortest path and other undesired paths for cancelling a distortion to which an original radio frequency pulse of an original pulse shape is subjected before reception as the distorted pulse. The multipath canceller comprises an envelope detector for envelope detecting the radio frequency signal to produce a detected pulse of a detected pulse shape in response to the distorted pulse, memory means for memorizing a distortionless pulse of a distortionless pulse shape, pulse position estimating means responsive to the detected and the distortionless pulses for estimating an estimated pulse position which the original radio frequency pulse has when received through the shortest path alone, and distortion cancelled pulse producing means responsive to the distortionless pulse and the estimated pulse position for producing at the estimated pulse position a distortion cancelled pulse which is exempted from the distortion.

According to another aspect of this invention, there is provided a multipath canceller responsive to each distorted pulse of a pulse amplitude modulated radio frequency signal received through a plurality of transmission paths comprising a shortest path and other undesired paths for cancalling a distortion to which an original radio frequency pulse of an original pulse shape is subjected before reception as the distorted pulse. The multipath canceller comprises first means responsive to the distorted pulse for producing a distortionless pulse of a distortionless pulse shape which is similar to the original pulse shape, and second means responsive to the distorted and the distortionless pulses for producing a distortion cancelled pulse which is exempted from the distortion.

Preferably, the second means comprises a cross-correlator responsive to the distorted and the distortionless pulses for producing a cross-correlation coefficient therebetween, an autorcorrelator responsive to the distortionless pulse for producing an autocorrelation coefficient thereof, pulse position estimating means responsive to the cross-correlation and the autocorrelation coefficients for estimating an estimated pulse position which the original radio frequency pulse has when received through the shortest path alone, and means responsive to the distortionless pulse and the estimated pulse position for producing the distortionless pulse at the estimated pulse position as the distortion cancelled pulse.

When the original pulse shape comprises no sine components but cosine components, the second means may comprise a discrete Fourier transform circuit responsive to the distorted pulse for producing a discrete Fourier transform thereof, a zero phasing circuit for frequency shifting the discrete Fourier transform to produce a frequency shifted transform which does not comprise the sine components but the cosine components, and an inverse discrete Fourier transform circuit responsive to the frequency shifted transform for producing an inverse discrite Fourier transform thereof as the distortionless pulse.

According to still another aspect of this invention, there is provided a multipath canceller responsive to each distorted pulse of a pulse amplitude modulated radio frequency signal received through a plurality of transmission paths comprising a shortest path and other undesired paths for cancelling a distortion to which an original radio frequency pulse of an original pulse shape is subjected before reception as the distorted pulse, wherein the distortion comprises a first and a second distortion component which are in an inphase and a quadrature phase relationship relitive to the original radio frequency pulse received through the shortest path alone and wherein the original pulse shape has instantaneous amplitudes which are distributed substantially according to Gaussian distribution. The multipath canceller comprises first power calculating means responsive to the radio frequency signal for calculating an instantaneous electric power of the signal as a first electric power, subtracting means for subtracting an input electric power from the first electric power to produce a difference electric power, pulse estimating means responsive to the difference electric power for estimating an estimated pulse, component estimating means responsive to the estimated pulse for estimating a first and a second estimated component which correspond to the first and the second distortion components, respectively, second power calculating means responsive to the estimated pulse and the first and the second estimated components for calculating an instantaneous electric power of the first and the second distortion components as a second electric power, means for delivering the second electric power to the subtracting means as the input electric power, and training means responsive to the estimated pulse and coupled to the component estimating means for training the first and the second estimated components so as to make the estimated pulse converge to the original radio frequency pulse received through the shortest path alone.

BRIEF DESCRIPTION OF THE DRAWING

FIG. 15 is a block diagram of a second simulator which is an inverse of the first simulator; and FIG. 16 is a block diagram of an inphase component predictor for use in the multipath canceller shown in FIG. 13.

DESCRIPTION OF THE PREFERRED EMBODIMENTS

Figure 1:
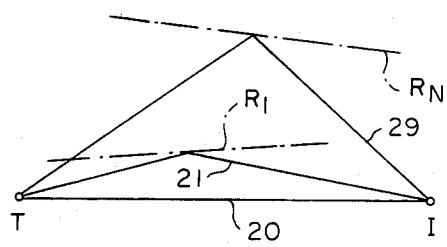
FIG. 1 is a schematic diagram of a space or earth's atmosphere for use in describing multipath transmission.

Referring to FIG. 1, a pulse amplitude modulated radio frequency signal of a radio navigation system is transmitted in space or earth's atmosphere from a transponder T of the system back to an interrogator I of the system. The interrogator I may be either carried by a vehicle, such as an aircraft, or installed in a ground station of the system. When the interrogator I is installed in a ground station, the transponder T is on board a vehicle. When the interrogator I is on board a vehicle, the transponder T is either installed in a ground station or carried by another vehicle.

It may be mentioned here that such a radio navigation system is a secondary radar of a sort. An interrogator transmits a pulse amplitude modulated radio frequency signal to a transponder as an interrogation signal. Responsive to the interrogation signal, the transponder transmits another pulse amplitude modulated radio frequency signal back to the interrogator as a response signal after a predetermined delay t known as a system delay in the art. The interrogation and the response signals are usually in different radio frequency bands. An interval of time T (the same reference letter being used) is measured at the interrogator between transmission of the interrogation signal and reception of the response signal. The interrogator knows a distance R to the transponder in accordance with:

$$R = (T-t)/12.3,$$

when the time interval T and the system delay t are measured in microsecond and the distance R, in nautical mile.

The response signal is received at the interrogator unavoidably through a plurality of transmission paths due to topographic and other influences. This applies to the interrogation signal received at the transponder. In other words, the interrogation and the response signals are subjected to multipath transmission. It will be assumed merely for simplicity of description that the multipath transmission results only from reflections of the radio frequency signal at mountains, buildings, and like reflecting bodies depicted by dash-dot lines as first through N-th reflecting bodies $R_1, \ldots,$ and $R_N$.

One of the transmission paths is a shortest or direct path 20. The first through the N-th reflecting bodies $R_1$ to $R_N$ are nearer to the shortest path 20 and farther therefrom. Another of the transmission paths results as indicated at 21 from the reflection at the first reflecting body $R_1$ that is nearest to the shortest path 20. The transmission path 21 in question is nearest to the shortest path 20 and will be called a nearest path. Still another of the transmission paths results as illustrated at 29 from the reflection at the N-th reflecting body $R_N$ that is farthest or most distant from the shortest path 20. The transmission path 29 is most distant from the shortest path 20 and is termed a most distant path. As the case may be, the transmission paths 21 through 29 will be named first through N-th paths. Paths near to the nearest path 21 are near paths. Paths near to the most distant path 29 are distant paths. The near and the distant paths are more precisely defined heretobefore and will again be described in the following. The near and the distant paths are referred to, when discrimination is unnecessary therebetween, as undesired paths. A distortion is caused by the multipath transmission to the radio frequency signal received at each of the interrogator and the transponder in the manner which will later be discussed in detail.

Figure 2:
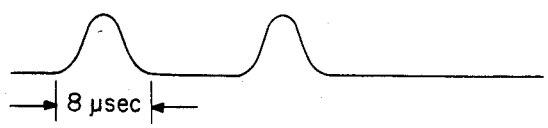
FIG. 2 shows a modulating pulse sequence used in a radio navigation system.

Turning to FIG. 2, the radio frequency signal is obtained by amplitude modulating a carrier signal of a radio frequency by a modulating pulse sequence of pulse pairs or twin pulses of a predetermined number of pair pulses per second. Each pulse pair consists of a first and a second modulating pulse in succession. The first and the second modulating pulses have a common original pulse shape which is substantially indentical with the Gaussian or normal distribution known in statistics. This pulse shape is preferred because of easy discrimination of the interrogation and the response signals from other signals and because of little disturbance to other radio frequency signals or electromagnetic waves which are used in other systems and are in an adjacent radio frequency band. Each original pulse shape has a smooth frequency characteristic and is symmetric on both sides of a time point corresponding to a maximum instantaneous amplitude. Each modulating pulse has a finite effective pulse duration or width of 8 microseconds.

Figure 3:
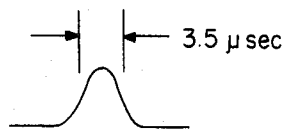
FIG. 3 shows a modulating pulse of the modulating pulse sequence depicted in FIG. 2.
Figure 4:
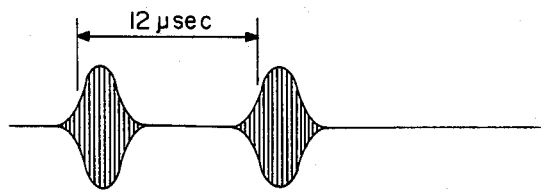
FIG. 4 schematically shows a radio frequency pulse pair.

Further turning to FIGS. 3 and 4, a reference point is selected for measurement of the above-mentioned time interval at a point or instant at which each modulating pulse has an instantaneous amplitude equal to a half of the maximum amplitude. As depicted in FIG. 4 for a pulse amplitude modulated radio frequency signal, each of a first and a second original (radio frequency) pulse has a half amplitude pulse width of 3.5 microsecnds in the distance measuring equipment of the TACAN system described hereinabove. Such a modulating pulse and such an original pulse shape will be called a standard modulating pulse and a standard pulse shape depending on the circumstances.

In each radio frequency pulse pair, the first and the second original pulses have a pulse interval of 12 microseconds between corresponding reference points of the respective original pulses. A pulse amplitude modulated radio frequency signal of this type is used also in a direction finder or bearing indicator as a bearing indication signal. In a direction finder, the radio frequency signal is continuously transmitted from a ground station towards a plurality of vehicles which are navigated in a service area or space of the direction finder.

The first and the second (radio frequency) pulses have a common shape, which will again be called an original pulse shape. The first and the second original pulses are received at the interrogator or the transponder through the transmission paths as a first and a second distorted (radio frequency) pulse, respectively. In the manner described heretobefore, the first and the second distorted pulses have a first and a second distorted pulse shape and are positioned at a first and a second distorted pulse position, respectively.

In a classical distance measuring equipment, the first distorted pulse is used in activating system clocks. The second distorted pulse is used in carrying out measurements. In a recent distance measuring equipment, the first distorted pulse is used for the measurements. The second distorted pulse is used in assisting discrimination of the radio frequency pulse pair from other radio frequency signals.

It is already described hereinabove that the first and the second original (radio frequency) pulses which would be received only through the shortest path 20 (FIG. 1), are distorted by the first and the second original pulses, respectively, which are received through the near paths exemplified by the first path 21. Such a distortion results in each of the first and the second original pulses actually received at the interrogator or the transponder from vector composition or addition which is produced, in a frequency domain of the radio frequency, in the original pulses during transmission through the transmission paths, namely, before reception through the shortest and the near paths. The second original pulse which would be received through the shortest path 20, is distorted by the first original pulse received through the distant paths, such as the N-th path 29. In this manner, the pulse amplitude modulated radio frequency signal reaches either the interrogator or the transponder with a composite distortion caused thereto by the multipath transmission. The distortion gives rise to a distance error both in the classical and the recent distance measuring equipments and to a bearing error in the direction finder.

The bearing error results in a greater positional error when the vehicle is remoter from the ground station. A smaller positional error results from the bearing error when the vehicle approaches nearer to the ground station. On the other hand, the distance error becomes serious when the interrogator and the transponder approaches each other. It will readily be understood that the distance error could result in grave consequences when an aircrfat comes near to an airport or another aircraft.

It is therefore mandatory for a classical distance measuring equipment to remove the distortion from the second original (radio frequency) pulse. For recent distance measuring equipment, it may be sufficient that the distortion be removed from the first original pulse alone. Even in this event, removal of the distortion from the second original pulse is desirous in facilitating discrimination of the radio frequency pulse pair. The removal, however, has not been carried out at all in conventional TACAN systems.

Figure 5:
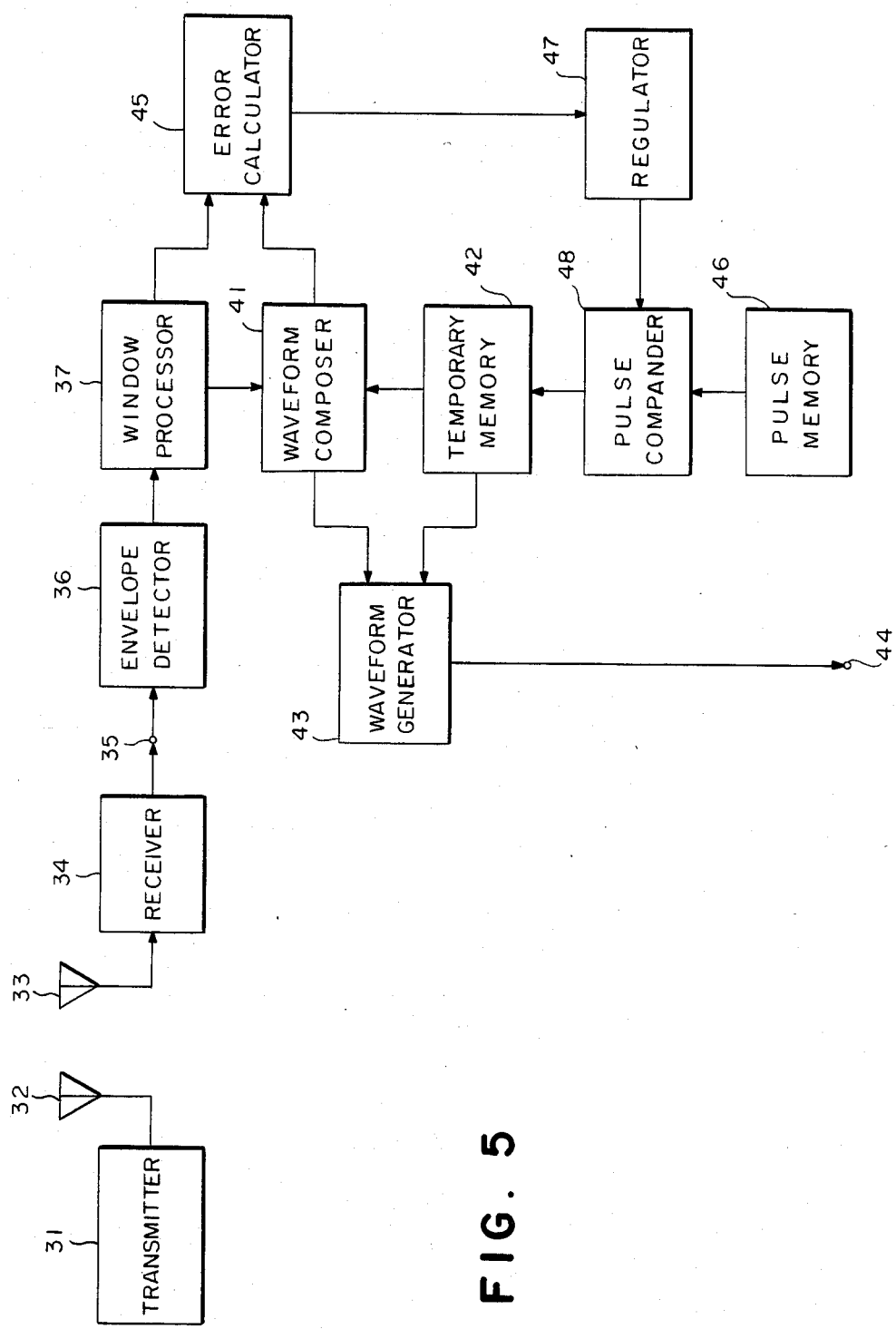
FIG. 5 shows in blocks a multipath canceller according to a first embodiment of the instant invention together with a transmitter and a receiver of a radio navigation system.
Figure 6A:
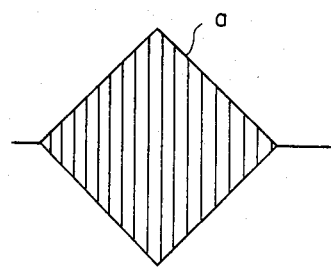
FIGS. 6(A) through (D) schematically show a few radio frequency pulses and a detected pulse which is derived by envelope detecting a radio frequency pulse received as a distorted radio frequency pulse.
Figure 8A:
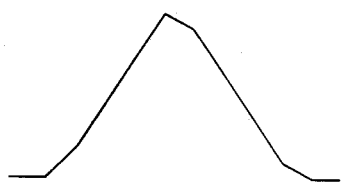
FIGS. 8(A) through (E) show several pulse shapes for use in describing a pulse composer used in the multipath canceller illustrated in FIG. 5.
Figure 6B:
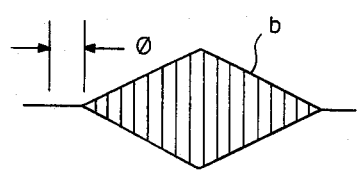
Figure 8B:
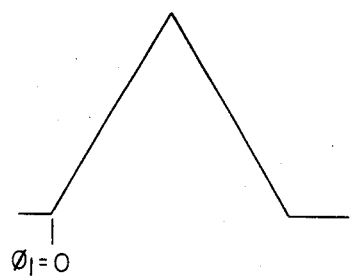
Figure 6C:
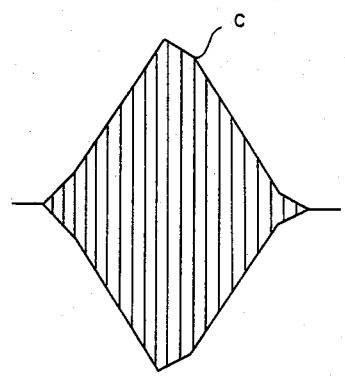
Figure 8C:
Figure 8D:
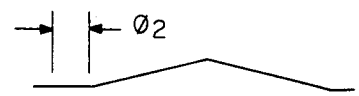
Figure 6D:
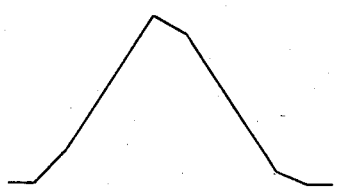
Figure 8E:
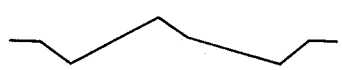

Referring now to FIG. 5, a radio navigation system comprises a transmitter 31 for transmitting a pulse amplitude modulated radio frequency signal through a transmission antenna 32 either as an interrogation signal or as a response signal. The radio frequency signal is received at a reception antenna 33 through a plurality of transmission paths and comprises a first and a second distorted (radio frequency) pulse in the manner described with reference to FIGS. 1 through 4. The radio frequency signal is amplified in a receiver 34 into an amplified signal. In a multipath canceller according to a first embodiment of the present invention, the amplified signal is processed as follows on the video level.

The multipath canceller has a multipath canceller input terminal 35, to which the amplified signal is delivered. An envelope detector 36 is for carrying out envelope detection of the amplified signal to produce a first and a second detected pulse in response to the first and the second distorted pulses, respectively. Each detected pulse has a detected pulse shape into which the common original pulse shape of the first and the second modulating pulses (FIG. 2) is distorted as a result of the multipath transmission. The relation between the detected pulse shape and the original pulse shape will later be described more precisely. A window processor 37 is for subjecting the first and the second detected pulses to analog-to-digital (A/D) conversion to produce analog-to-digital converted pulses and for memorizing the converted pulses as a first and a second stored pulse.

Turning to FIG. 6 for a short while, a radio frequency pulse is schematically depicted as a triangular pulse in a top or first line labelled (A) in the figure. The radio frequency pulse is obtained as an original (radio frequency) pulse of an original pulse shape by amplitude modulating the above-mentioned carrier signal by a modulating pulse of a modulating pulse shape. It will be assumed that the original pulse is what would be received at the reception antenna 33 (FIG. 5) when the pulse amplitude modulated radio frequency signal is received through the shortest path 20 (FIG. 1) alone. Another radio frequency pulse arrives at the reception antenna 33 through one of the near paths as a distorting pulse as exemplified in a second line labelled (B). The distorting pulse would have a smaller instantaneous amplitude and a transmission delay relative to the original pulse. In the example being illustrated, the transmission delay is equal to a phase difference $\phi$ of $\pi/4$ in terms of the radio frequency phase.

If the influences of the radio frequency signal received through other undesired paths is left out of consideration for the time being, a distorted pulse actually reaches the reception antenna 33 instead of the original (radio frequency) pulse and the distorting pulse. The distorted pulse has a distorted pulse shape and a distorted pulse position depicted in a third line labelled (C) in the manner which will presently be described. The above-mentioned detected pulse is shown in a bottom line labelled (D) at the distorted pulse position. When the original and the distorting pulse shapes have instantaneous amplitudes a and b, the distorted pulse shape has an instantaneous amplitude c which is given by:

$$c = \sqrt{(a^2 + 2ab \cos \phi + b^2)}.$$

Turning back to FIG. 5, the first and the second stored pulses have a pulse shape which is approximately congruent with the detected pulse shape illustrated in the bottom line (D) of FIG. 6. Each stored pulse is delivered from the window processor 37 to a waveform composer or pulse position estimating unit 41. For the purpose which will later become clear, the window processor 37 cuts a portion from a succession of the first and the second stored pulses as a partial pulse. The partial pulse is for a predetermined duration from the beginning of the succession. The predetermined duration may be 8 microseconds (FIG. 2). A temporary memory 42 is for memorizing signals representative of a distortionless pulse of a distortionless pulse shape. The modifier "temporary" is used for the reason which will later become clear. When the modulating pulse has the standard pulse shape described above, the distortionless pulse shape is similar to the original pulse shape shown in the top line (A) of FIG. 6. More specifically, the distortionless pulse shape differs from the original pulse shape only in the instantaneous amplitudes. The expression "a pulse" will be used hereinafter instead of "signals representative of the pulse" for brevity of description. It is clear that the stored digital representations correspond to the pulse shape of the pulses when the representative digital signals are considered as a group, the original storing being done at certain fixed time intervals in the A/D converter of the window processor 37.

Figure 7:
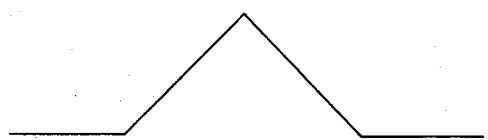
FIG. 7 is a schematic diagram of a distortionless pulse used in the multipath canceller depicted in FIG. 5.

Referring to FIGS. 7 and 8 in addition to FIG. 5, the distortionless pulse is a triangular pulse under the circumstances as exemplified in FIG. 7. By referring to each stored pulse delivered from the window processor 37, the waveform composer 41 carries out vector composition or addition at first on the distortionless pulse supplied from the temporary memory 42 as will shortly be described and produces a composite pulse of a composite pulse shape or waveform which approximates the detected pulse shape.

In FIG. 8, the detected pulse shape is again illustrated in a top or first line labelled (A). It will now be assumed that the stored pulse has instantaneous amplitudes and a pulse position depicted in the top line. With reference to the stored pulse, the waveform composer 41 modifies the distortionless pulse into a modified pulse shown in a second line labelled (B). The modified pulse has an initial amplitude and an initial pulse position which are in a best relationship relative to the stored pulse. The best relationship may be defined by cross-correlation between the stored pulse depicted in the top line (A) and the distortionless pulse. Alternatively, the best relationship may be defined either by a sum of absolute values of differences between the stored and the distortionless pulses or by a square sum of the differences. As a further alternative, the best relationship may be defined merely by a time instant at which each of the stored and the distortionless pulses has a peak value. The modified pulse being illustrated, has a radio frequency phase difference $\phi_1$ of zero relative to the stored pulse.

The modified pulse is linearly substracted from the stored pulse to provide a difference pulse illustrated in a third line labelled (C). By carrying out comparison between the modified and the difference pulses in the manner which will presently be described, a comparison pulse is obtained as depicted in a fourth line labelled (D). The comparison pulse is for use in defining a comparison amplitude and a comparison phase difference $\phi_2$. The comparison phase difference $\phi_2$ is relative to the stored pulse and is in terms of the radio frequency phase. The comparison is therefore for defining the comparison amplitude and the comparison phase difference $\phi_2$. More specifically, the comparison is carried out by solving a minimization problem for a difference between the stored pulse and a vector sum of the modified and the comparison pulses. The minimization problem may be solved by numerically calculating a minimum of the electric power of a pulse exemplified in a bottom line labelled (E) as the difference between the stored pulse and the vector sum. In the example being illustrated, the comparison phase difference $\phi_2$ is equal to $\pi/4$.

The waveform composer 41 repeatedly modifies the distortionless pulse into a plurality of modified pulses a predetermined number of times, such as twenty times, with various amplitudes, pulse positions, and radio frequency phases. The waveform composer 41 subsequently carries out the vector composition of those of the various modified pulses which have a common pulse position, thereby to produce composite pulses as mentioned above. Such composite pulses have different amplitudes and different pulse positions. Those of the composite pulses are discarded which have appreciably small amplitues as compared with the maximum amplitude of the composite pulses. From remaining ones of the composite pulses, one composite pulse is selected as a reference pulse that is of an earliest occurrence. The reference pulse has an estimated amplitude and an estimated pulse position which the original (radio frequency) pulse would have if received through the shortest path 20 (FIG. 1) alone. The waveform composer 41 produces information representative of the estimated amplitude and of the estimated pulse position. It will now readily be possible for one skilled in the art to implement such a waveform composer 41 by a microprocessor.

A waveform generator or distortion cancelled pulse producing unit 43 receives the information of the estimated amplitude and the estimated pulse position from the waveform composer 41 and the distortionless pulse from the temporary memory 42. In compliance with the information of the estimated amplitude, the waveform generator 43 either amplifies or attenuates the distortionless pulse to provide an adjusted pulse. Responsive to the information of the estimated pulse position, the waveform generator 43 shifts the adjusted pulse to the estimated pulse position to thereby supply a multipath canceller output terminal 44 with a distortion cancelled pulse which is exempted from the distortion caused to the original pulse by the distorting pulse. The information of the estimated amplitude is unnecessary when the radio navigation system is not a TACAN system.

It will readily be understood from the above that the distortion cancelled pulse is exempted from the composite distortion which results in the original (radio frequency) pulse from reception through the transmission paths. This applies not only to the first original pulse but also to the distortion to which the second original pulse is subjected by the multipath transmission.

Depending on the radio navigation system, the original pulse shape may be different from a standard pulse shape of a standard modulating pulse which has the half amplitude width of 3.5 microseconds (FIG. 3). In other words, the original pulse shape may be different in duration from the standard pulse shape. The above-described partial pulse is for use in this case and is delivered from the window processor 37 to a first input terminal of an error calculator 45 having a second input terminal supplied from the waveform composer 41 with each of the composite pulses. The error calculator 45 calculates an error between the partial pulse and each composite pulse. It is possible to understand that the error calculator 45 is responsive to the detected pulse and each composite pulse for calculating an error therebetween.

Together with the waveform composer 41 and the temporary memory 42, the error calculator 45 is included in a training circuit, namely, a learning identification circuit, which additionally comprises a pulse memory 46 for memorizing the standard modulating pulse. Responsive to the error, a regulator 47 produces a regulation signal. A pulse compander 48 is responsive to the regulation signal for linearly companding the standard modulating pulse supplied from the pulse memory 46. That is, the pulse compander 48 linearly compresses or expands the duration of the standard modulating pulse into an adjusted duration in compliance with the regulating signal to produce an adjusted pulse (the same name being used) of the adjusted duration. A combination of the regulator 47 and the pulse compander 48 serves as a duration adjusting unit responsive to the error for adjusting the duration of the standard pulse to produce the adjusted pulse. This is because the regulator 47 produces the regulating signal representative of the error and because the compander 48 compresses or expands the duration of the standard pulse in compliance with the regulating signal.

The adjusted pulse is stored in the temporary memory 42 as the distortionless pulse. The waveform composer 41 produces the reference pulse each time when the temporary memory 42 is supplied with an adjusted pulse whose duration is controlled afresh in compliance with the error between the detected pulse and the composite pulse for the currently produced reference pulse. The training circuit thus makes the error converge to zero. Incidentally, it is possible to use the pulse memory 46 in storing a plurality of pulses of various initial amplitudes and initial pulse positions. This raises the speed of convergence.

The multipath canceller processes each distorted pulse in the manner thus far described. Each processing time for the radio frequency signal received at the reception antenna 33, is therefore about 8 microseconds. It may be mentioned here that the above-described multipath canceller is operable when a substantially constant phase relationship holds during each processing time between the radio frequency pulses which should be subjected to the vector composition in the radio frequency domain as described in conjunction with FIG. 4. This applies to the multipath canceller with and without the training circuit because it is empirically known that the phase varies only several degrees in angle at most in a TACAN system when the radio frequency is about 1 GHz.

Figure 9:
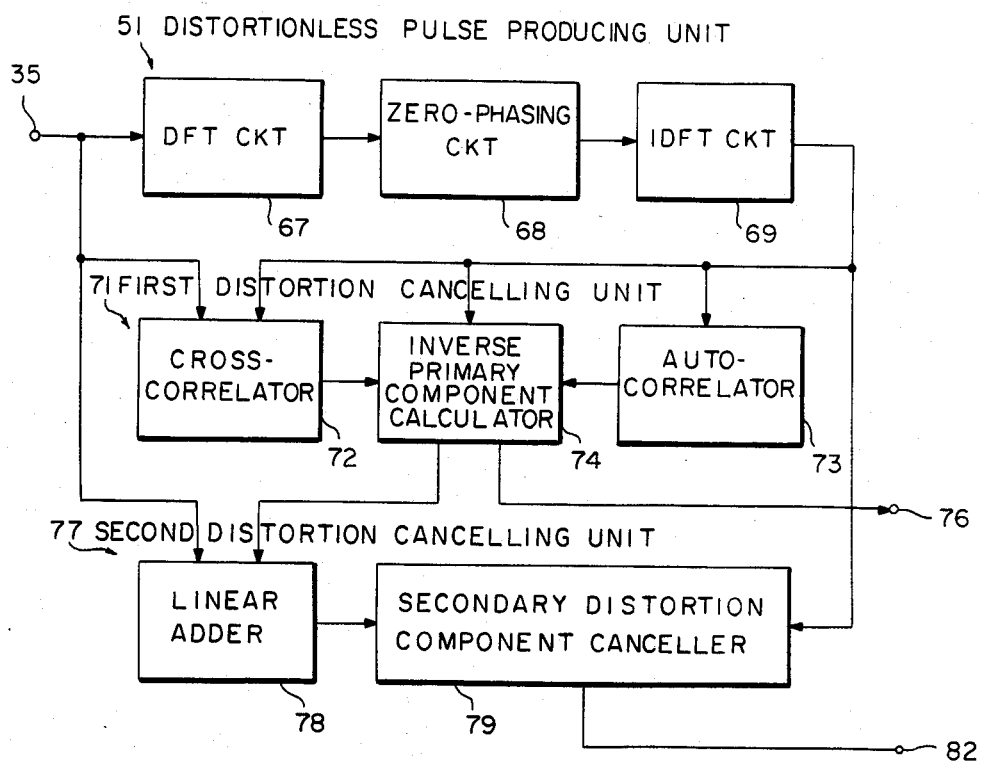
FIG. 9 is a block diagram of a multipath canceller according to a second embodiment of this invention.

Referring now to FIG. 9, a multipath canceller is operable on the carrier level according to a second embodiment of this invention. The multipath canceller being illustrated, has a multipath canceller input terminal which is for receiving the amplified signal as it stands. The input terminal is therefore designated again by the reference numeral 35. As described before, the amplified signal comprises the first and the second distorted (radio frequency) pulses which are actually received through the transmission paths comprising the shortest, near, and distant paths. More particularly, the input terminal 35 is supplied with a first distorted (radio frequency) pulse and a second distorted (radio frequency) pulse which succeeds the first distorted pulse. The composite distortion of the first distorted pulse will now be called a primary distortion component. The second distorted pulse undergoes the primary distortion component as a result of reception through the near paths. A remaining part of the composite distortion which is additionally caused to the second distorted pulse as a result of reception of the first original (radio frequency) pulse through the distant paths, will be named a secondary distortion component.

A distortionless pulse producing unit 51 is responsive to each of the first and the second distorted pulses for producing a distortionless (radio frequency) pulse of a distortionless pulse shape at a preliminary pulse position. Attention will now be directed to an original (radio frequency) pulse described in conjunction with the top line (A) of FIG. 6. Each distorted pulse is a vector sum of a distorting pulse of a distorting pulse shape of the type described in connection with the second line (B) of FIG. 6 and the original pulse which would be received through the shortest path alone.

Those portions of the original pulse which are received through the respective undesired paths, provide the distorting pulse when subjected to vector composition or addition. For the first distorted pulse, the distorting pulse would be simpler. The distorting pulse shape would be more complicated for the second distorting pulse. At any rate, the distortionless pulse shape is equal to a vector difference obtained by subtracting the distorting pulse from the distorted pulse.

Figure 10:
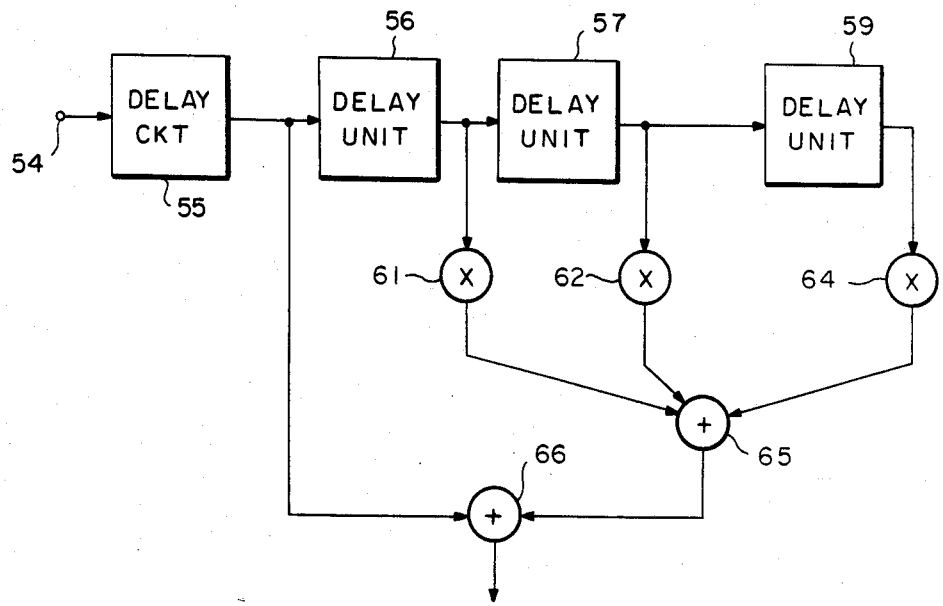
FIG. 10 is a block diagram of a simulator for use in describing a distortion caused to a radio frequency pulse by the multipath transmission and principles of operation of the multipath canceller depicted in FIG. 9.

Turning temporarily to FIG. 10, a simulator will be described in order to clarify the distorting pulse and the principles of operation of the distortionless pulse producing unit 51. The simulator has a simulator input terminal 54 which is supplied in the transmitter 31 (FIG. 5) with a first and a second original (radio frequency) pulse as the radio frequency pulse pair illustrated with reference to FIG. 4. For clarity of description, the original pulses will be called originating (radio frequency) pulses insofar as the transmitter 31 is concerned. A single delay circuit 55 is for giving the originating pulses a fixed delay equal to the transmission delay to which the originating pulses are subjected before reception at the multipath canceller input terminal 35 (FIG. 9) through the shortest path 20 (FIG. 1) as the original pulses. The original pulses as now called, will collectively be referred to as a zeroth (radio frequency) pulse.

The simulator comprises a delay line comprising first through I-th delay units 56, 57, . . . , and 59 where I represents an integer which is greater than the number N of the reflecting bodies $R_1$ through $R_N$ described in conjunction with FIG. 1. The delay units 56 through 59 are for producing a first (radio frequency) pulse, . . . , and an I-th (radio frequency) pulse, respectively, by giving a unit delay $z^{-1}$ to the zeroth through the $(I-1)$-th pulses supplied thereto. In order to described the unit delay, a specific undesired path will be taken into consideration. The specific undesired path may be nearer to the shortest path 20 (FIG. 1) than the first path 21. Relative to the original pulse which would be received through the shortest path 20, the original pulse received through the specific undesired path has a transmission delay which is equal to the unit delay. Those portions of the original pulse which would be received through the first through the N-th paths 21 to 29, are therefore first through N-th ones of the first through the I-th pulses.

First through I-th multipliers 61, 62, . . . , and 64 are for multiplying first through I-th weighting factors $a_1$, $a_2$, . . . , $a_I$ to the first through the I-th pulses, respectively. The multipliers 61 through 64 thereby produce amplitude adjusted pulses and deliver the amplitude adjusted pulses to a local adder 65 which produces the distorting pulse. An overall adder 66 is for adding the distorting pulse to the zeroth pulse to produce the first and the second distorted pulses.

It should be noted in connection with the simulator that the number of the near paths and the number of the distant paths depend not only on the number of reflecting bodies $R_1$ through $R_N$ but also on the distance between the transmission and the reception antennas 32 and 33 (FIG. 5) and the beam angle in which the radio frequency signal is transmitted from the transmission antenna 32. A combination of the delay units 56 through 59, the multipliers 61 through 64, and the local adder 65 is a digital filter which is widely used in the art. The digital filter has a transfer function $H(z)$. It is also known in the art that the z-transform z is represented by $\exp(j\lambda)$ where $\lambda$ is given as $2\pi f\Delta T$ by the radio frequency f of the carrier signal and the sampling interval ΔT. Like simulators will later be described.

Figure 11:
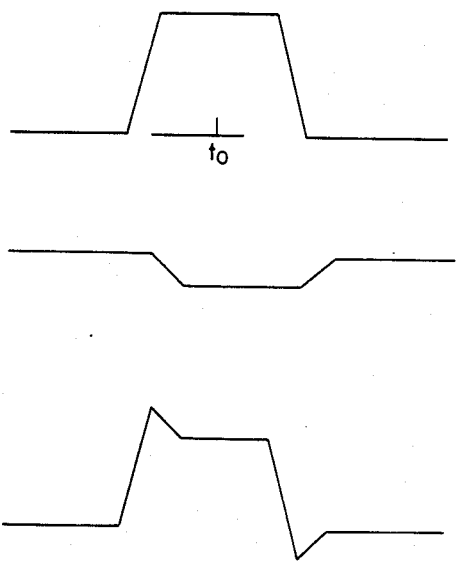
FIG. 11 schematically shows pulse shapes of an original radio frequency pulse, a distorting pulse, and a distorted pulse.

Further turning to FIG. 11, the original pulse shape is depicted in a top line as a trapezoidal pulse. Incidentally, a time instant $t_0$ shows the instant of the maximum instantaneous amplitude (FIG. 2). The pulse shape is symmetric on both sides of the instant $t_0$. Like in FIG. 6, it will be assumed that the original pulse shape is what would be had by each of the first and the second original (radio frequency) pulses supplied to the multipath canceller input terminal 35 (FIG. 9) through the shortest path alone. A distorting pulse shape illustrated in a second line, is what would be had by the first original pulse supplied to the input terminal 35 through one of the near paths. In the example being illustrated, the distorting pulse is antiphase relative to the original pulse shape and has a transmission delay of Δt relative to the original pulse shape.

In the manner described in conjunction with FIG. 5, phase difference scarcely occurs in the carrier signal from the multipath transmission during each processing time. The processing time may now be equal to 12 microseconds (FIG. 4) when the radio frequency is about 1 GHz as before and furthermore when the interrogator moves relative to the transponder at a relative speed of 1,000 km/hour. When such a constant phase relationship holds, it is possible to derive the distorted pulse shaped by linear addition of the original and the distorting pulse shapes. The distorted pulse shape is illustrated at a bottom line.

Referring back to FIG. 9, the distortionless pulse producing unit 51 comprises a discrete Fourier transform (DFT) circuit 67 known in the art for processing each of the first and the second distorted pulses in each processing time into the discrete Fourier transform in a processing frequency band which is based on the radio frequency of the carrier signal. The discrete Fourier transform circuit 67 thereby transforms the distorted (radio frequency) pulse to a processed signal of the frequency domain, namely, divides the distorted pulse into a sine and a cosine component of the frequency domain.

The processed signal is delivered to a shifter 68 for use in cancelling the sine component and in producing the cosine component alone. Inasmuch as the discrete Fourier transform has discrete values, the shifter 68 may make use of the cyclic nature known in the discrete Fourier transform processing. In other words, the shifter 68 gives a shift such that the sine component may become symmetric as regards an origin of a frequency axis of the frequency domain. The sine component thereby becomes zero. Only the cosine component remains, which is symmetric on both sides of a level axis which is orthogonal to the frequency axis at the origin. The speak of the pulse shapes illustrated with reference to FIG. 11, the distorted pulse shape is asymmetric on both sides of the instant $t_0$. This results from the sine component. The shift is equal in the illustrated example to the transmission delay Δt. The cosine component gives a pulse shape which is similar to the original pulse shape in the frequency domain. It is now understood that the shifter 68 zero-phases the discrete Fourier transform in the manner reported by B. S. Atal at the 95th meeting of the Acoustical Society of America and recorded in *Journal of Acoustical Society of America*, Volume 63, Supplement No. 1 (Spring 1978), page S 79, under the title of "On Finding the Optimum Excitation for LTC Speech Synthesis." The shifter 68 is therefore referred to herein as a zero-phasing circuit.

The processed signal representative of the cosine component alone, is fed to an inverse discrete Fourier transform (IDFT) circuit 69 known in the art. The inverse discrete Fourier transform circuit 69 carries out the inverse discrete Fourier transform on the processed signal and produces the above-described distortionless pulse at the above-mentioned preliminary pulse position. Incidentally, the distortionless pulse producing unit 51 is operable to produce the distortionless pulse from either of the first and the second distorted pulses.

The first and the second distorted pulses and the distortionless pulse are supplied to a first distortion cancelled pulse producing unit 71. Attention will be directed to the first distorted pulse alone merely for simplicity of description. The unit 71 is for producing a first distortion cancelled (radio frequency) pulse at a correct pulse position and, in addition thereto, a component signal representative of the primary distortion component. The first distortion cancelled pulse is of the distortionless pulse shape. The correct pulse position is shown in the top line of FIG. 11. The first distortion cancelled pulse is what would result from reception of the first original (radio frequency) pulse through the shortest path alone.

The first distortion cancelled pulse producing unit 71 comprises a cross-correlator 72 known in the art for use in calculating a cross-correlation coefficient between the first distorted pulse and the distortionless pulse. An autocorelator 73 is also known in the art and is for calculating an autocorrelation coefficient of the distortionless pulse. The distortionless pulse is delivered to an inverse primary component calculator 74. Responsive to the cross-correlation and the autocorrelation coefficients, the calculator 74 calculates in the manner described in the following the correct pulse position to produce the distortionless pulse at the correct pulse position as the first distortion cancelled pulse. The calculator 74 furthermore calculates an inverse of the primary distortion component as an inverse primary distortion component. The first distortion cancelled pulse is delivered to a first multipath canceller output terminal 76.

It will be understood from the foregoing that each distorted pulse may be derived by linear addition of the distortionless pulses which are given different delays or pulse positions and are multiplied by the weighting factors. The cross-correlation coefficient therefore is equal to a linear sum of the autocorrelation coefficient multiplied by the weighting factors. It is possible by cut and try to carry out estimation of the weighting factors.

The estimation is, however, carried out more effectively as follows. The cross-correlation coefficient has a maximum absolute value $\phi_0$ at a zeroth delay time $\tau_0$. The autocorrelation coefficient is normalized by the maximum absolute value $\phi_0$ and then subtracted from the cross-correlation coefficient with the center rendered coincident with the zeroth delay $\tau_0$ to produce a first residual (cross-correlation) coefficient. The first residual coefficient has a first maximum absolute value $\phi_1$ (the same reference symbol being used) at a first delay $\tau_1$. The autocorrelation coefficient is now normalized by the first maximum absolute value $\phi_1$ and subsequently subtracted from the first residual coefficient to provide a second residual (cross-correlation) coefficient of a second maximum absolute value $\phi_2$ and a second delay $\tau_2$. Third, fourth, and other maximum absolute values and delays are obtained in this manner until the maximum absolute value becomes negligible. The correct pulse position is given by a minimum of the delays $\tau_0, \tau_1, \tau_2$, and so forth. The inverse primary distortion component is decided by the maximum absolute values $\phi_0, \phi_1, \ldots, \phi_{i-1}, \phi_{i+1}, \ldots$, and $\phi_I$ and the delays $\tau_0, \tau_1, \ldots, \tau_{i-1}, \tau_{i+1}, \ldots$, and $\tau_I$ if an i-th (radio frequency) pulse of the type described in conjunction with FIG. 10 has a greater amplitude than the zeroth pulse. The component signal may represent the inverse primary distortion component rather than the primary distortion component as it is. The inverse primary distortion component is produced with a delay which is equal to the pulse interval, such as 12 microseconds. It is now readily possible for one skilled in the art to implement such an inverse primary component calculator 74 by a microprocessor.

The first and the second distorted pulses and the component signal are supplied to a second distortion cancelled pulse producing unit 77. The unit 77 is for producing a second distortion cancelled (radio frequency) pulse at a correct pulse position thereof. The second distortion cancelled pulse is what would result from reception of the second original pulse through the shortest path alone.

The second distortion cancelled pulse producing unit 77 comprises a linear adder 78 responsive to the component signal for linearly adding the inverse primary distortion component to the second distorted pulse to produce a preliminarily distortion cancelled pulse at the pulse position of the second distortion pulse. The preliminarily distortion cancelled pulse is a pulse which is essentially identical with the second distorted pulse minus the primary distortion component. A second distortion component calculator 79 is identical in structure with the first distortion cancelled pulse producing unit 71 except that the inverse primary component calcuator should produce only the second distortion cancelled pulse at the correct pulse position in the manner described above and need not produce the component signal of the type described before. The canceller 79 delivers the second distortion cancelled pulse to a second multipath canceller output terminal 82.

Figure 12:
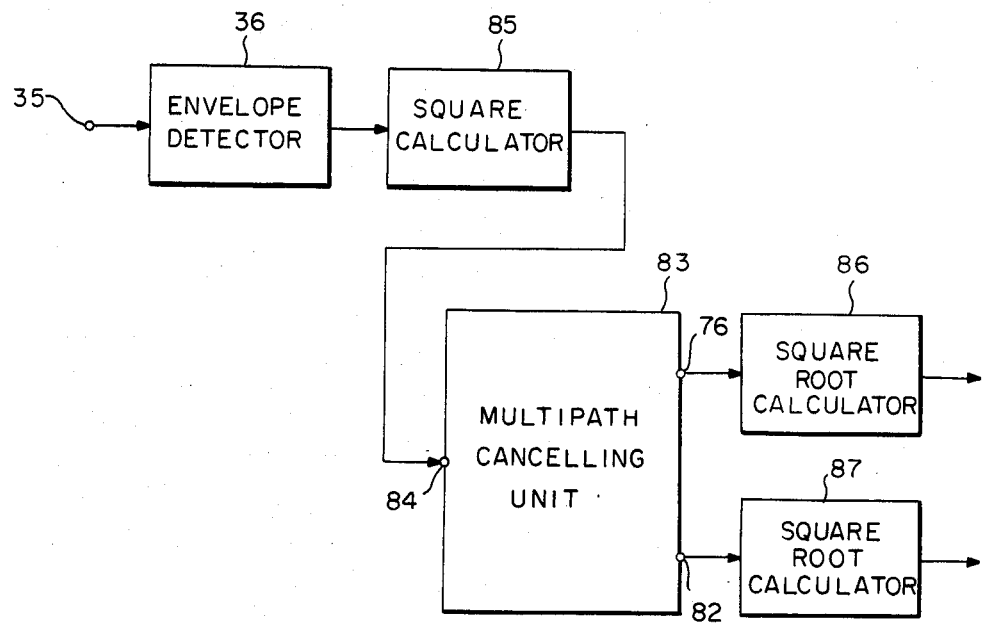
FIG. 12 is a block diagram of a multipath canceller according to a modification of the multipath canceller depicted in FIG. 9.

Referring to FIG. 12, a multipath canceller is operable on the video level according to a modification of the multipath canceller illustrated with reference to FIG. 9. The multipath canceller being illustrated, has a multipath canceller input terminal and comprises an envelope detector. The input terminal and the detector are equivalents of those described in connection with FIG. 5 and will be designated by the like reference numerals 35 and 36. It may now be pointed out that the envelope detection gives each of the first and the second detected pulses a nonlinear distortion which results from the first distortion component and a combination of the first and the second distortion components, respectively. A multipath cancelling unit 83 is an equivalent of the multipath canceller illustrated with reference to FIG. 9 and has a unit input terminal 84 and a first and a second unit output terminal. The unit output terminal correspond to the first and the second multipath canceller output terminals and will again be designated by the reference numerals 76 and 82.

In order to remove the nonlinear distortion resulting from the envelope detection, a square calculator 85 calculates the square of each of the first and the second detected pulses to produce a first and a second squared pulse in succession. Each of the first and the second squared pulses represents a scalar quantity in contrast to each distorted pulse which intrinsically represents a vector quantity.

In the manner already described in conjunction with FIGS. 9 through 11, the multipath cancelling unit 83 supplies the first and the second unit output terminals 76 and 82 with distortion cancelled (video frequency) pulses which may again be called first and second distortion cancelled pulses, respectively. First and second square root calculators 86 and 87 are for calculating the square roots of the first and the second distortion cancelled pulses, respectively. The square and the square root calcuators 85 through 88 may be dispensed with.

Reviewing FIGS. 5 through 12, the multipath canceller comprises a preliminary circuit for producing a distortionless pulse of the original pulse shape and a distortion cancelling circuit responsive to the distortionless pulse and each distorted pulse for producing the distortionless pulse as a distortion cancelled pulse at a correct pulse position which the original pulse would have if received through the shortest path alone. In FIG. 5, the preliminary circuit comprises the temporary memory 42 for the distortionless pulse. The distortion cancelling circuit comprises the envelope detector 36, the waveform composer 41, and the waveform generator 43. In FIG. 5, the preliminary circuit produces the distortionless pulse by itself. Alternatively, the preliminary circuit of FIG. 5 comprises the pulse memory 46 in addition to the temporary memory 42 and is controlled by each distorted pulse to adjust the standard pulse into the distortionless pulse. In FIG. 9, the preliminary circuit is implemented by the distortionless pulse producing unit 51. The distortion cancelling circuit comprises either only the first distortion cancelled pulse producing unit 71 or the first and the second distortion cancelled pulse producing units 71 and 77.

Figure 13:
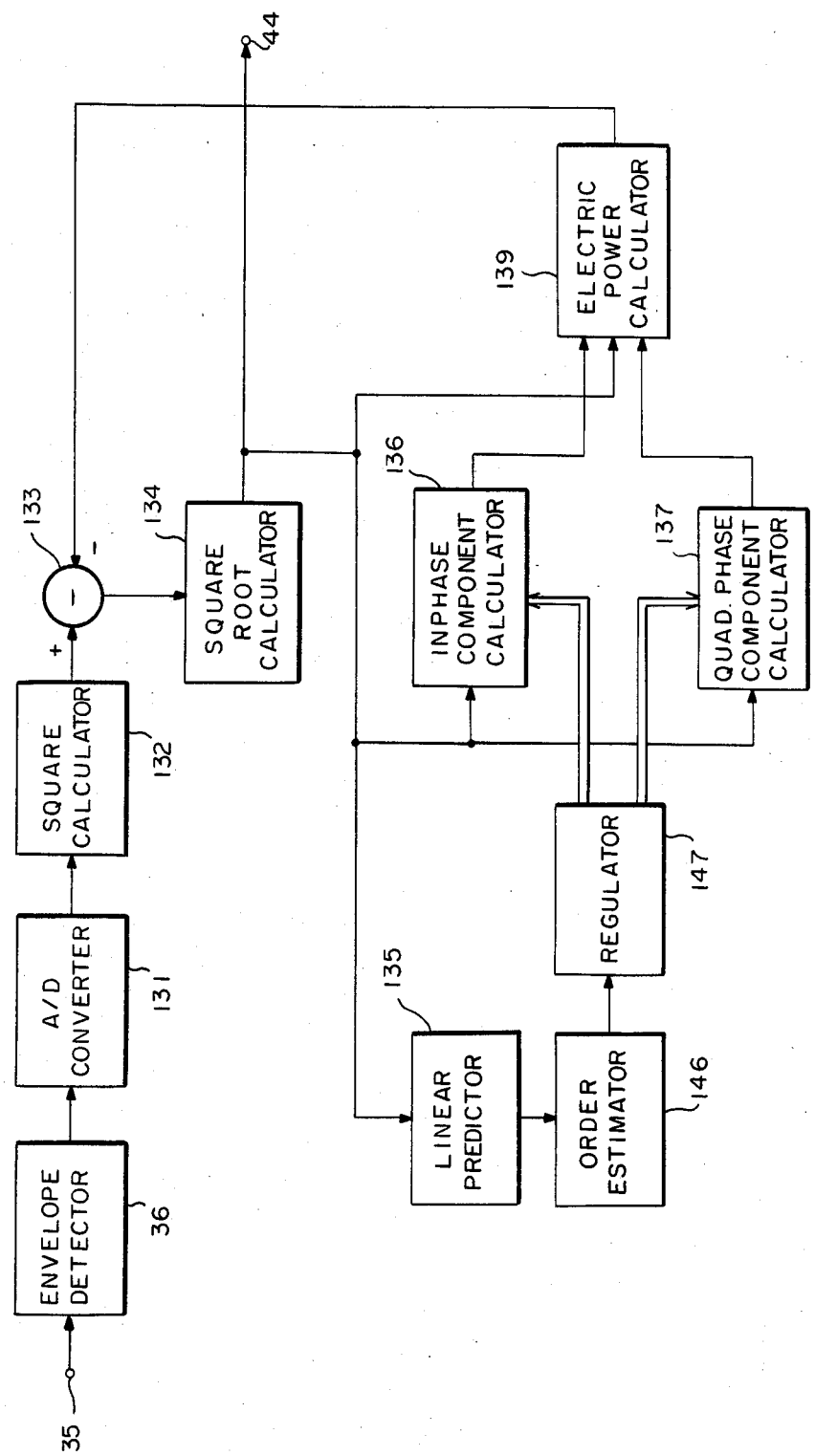
FIG. 13 is a block diagram of a multipath canceller according to a third embodiment of this invention.

Referring now to FIG. 13, a multipath canceller is operable again on the carrier level according to a third embodiment of this invention. The multipath canceller has multipath canceller input and output terminals and comprises an envelope detector. Like in FIG. 5, the terminals and the detector will be designated once more by the reference numerals 35, 44, and 36, respectively. In the manner described before in conjunction with FIG. 5, the envelope detector 36 produces a first and a second detected pulse in succession. Pulse shapes which the first and the second detected pulses have, will be referred to collectively as a detected pulse shape.

Figure 14:
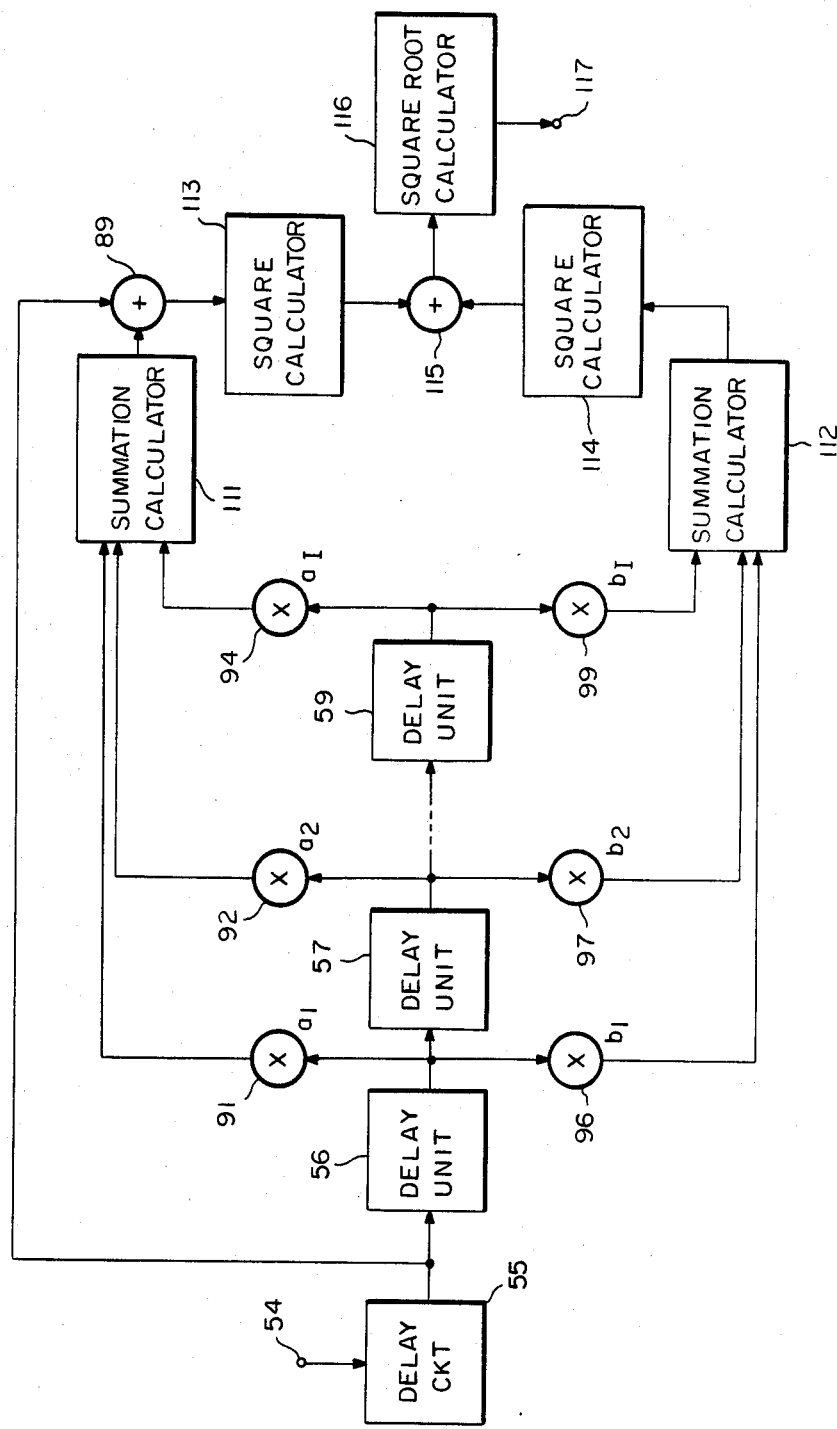
FIG. 14 is a block diagram of a first simulator for use in describing a detected pulse which is derived by envelope detecting a distorted radio frequency pulse comprising inphase and quadrature phase components.

Turning temporarily to FIG. 14, a first simulator is for simulating the detected pulse shape. The simulator has a simulator input terminal and comprises a single delay circuit and first through I-th delay units. The terminal, the circuit, and the units are similar to the corresponding circuit elements described in connection with FIG. 10 and will be designated by the like reference numerals 54, 55, and 56 through 59. In the manner which will become clear as the description proceeds, the pulse amplitude modulated radio frequency signal received through the transmission paths, is now divided into inphase and quadrature phase components having an inphase and a quadrature phase relationship relative to the radio frequency signal which would be received through the shortest path alone and which includes a distortionless (radio frequency) pulse of the original pulse shape. Each distorted (radio frequency) pulse actually received in the radio frequency signal, has a distortion comprising a first and a second distortion component which are in the inphase and the quadrature phase relationships, respectively.

The zeroth (radio frequency) pulse described in connection with FIG. 10, is delivered from the single delay circuit 55 directly to an inphase adder 89 as a zeroth one of the inphase components. First through I-th inphase multipliers 91, 92, ..., and 94 are for multiplying first through I-th inphase weighting factors $a_1, a_2, \ldots,$ and $a_I$ (the same reference symbols being used) to the first through the I-th (radio frequency) pulses, respectively. First through I-th quadrature phase multipliers 96, 97, ..., and 99 are for multiplying first through I-th quadrature phase weighting factors $b_1, b_2, \ldots,$ and $b_I$ to the first through the I-th pulses. The first through the I-th inphase multipliers 91 to 94 thereby produce first through I-th inphase components, which are delivered to an inphase summation calculator 111. Likewise, first through I-th quadrature phase components are fed to a quadrature phase summation calculator 112 from the first through the I-th quadrature phase multipfiers 96 to 99.

Attention will be directed to the specific undesired path described in conjunction with FIG. 10 and to a phase difference given by an angle which is equal to $\arctan(a_1/b_1)$. The phase difference is what occurs between two carrier signals which would be received through the shortest path and the specific undesired path, respectively. A factor which is equal to $\sqrt{(a_1^2+b_1^2)}$, is equal to a ratio of electric fields of the two carrier signals. It therefore follows that the carrier signal which would be received only through the specific undesired path, has the first inphase and quadrature phase components. The second inphase and quadrature phase components are had by another carrier signal received through another undesired transmission path of a transmission delay which is longer by the unit delay than the transmission delay of the specific undesired path.

In the manner which will presently be described quantitiatively, the inphase summation calculator 111 calculates a summation of the first through the I-th inphase components. The summation gives the first distortion component. The inphase adder 89 produces an inphase sum of the zeroth pulse and the first distortion component. The quadrature phase summation calculator 112 produces a quadrature phase sum of the first through the I-th quadrature phase components. The quadrature phase sum provides the second distortion component. The inphase and the quadrature phase sums are squared by inphase and quadrature phase square calculators 113 and 114, respectively. An overall adder 115 is for calculating an overall sum of squares which are calculated by the inphase and the quadrature phase square calculators 113 and 114, respectively. Responsive to the overall sum, a square root calculator 116 supplies a simulator output terminal 117 with a simulator output signal which has the detected pulse shape.

The zeroth (radio frequency) pulse is the distortionless pulse of the original pulse shape. Samples into which the distortionless pulse is sampled at sampling instant $\ldots, -i, (-i+1), \ldots, -2, -1, 0, 1, 2, \ldots,$ will be denoted by $\ldots, x_{-i}, x_{-i+1}, \ldots, x_{-2}, x_{-1}, x_0, x_1, x_2, \ldots$. The inphase and the quadrature phase sums produced at a sampling instant j are given by:

$$y_j = x_j + \sum_{k=1}^{I} a_k \cdot x_{j-k} \tag{1}$$

and $$z_j = \sum_{k=1}^{I} b_k \cdot x_{j-k'} \tag{2}$$

respectively. In Equation (1), the second term on the righthand side gives an instantaneous value of the first distortion component at the instant j. Equation (2) gives a like instantaneous value of the second distortion component. The overall sum is given according to:

$$u_j = x_j^2 + 2x_j \cdot \sum_{k=1}^{I} a_k \cdot x_{j-k} + \left(\sum_{k=1}^{I} a_k \cdot x_{j-k}\right)^2 + \left(\sum_{k=1}^{I} b_k \cdot x_{j-k}\right)^2, \tag{3}$$

which represents an instantaneous electric power of the pulse amplitude modulated radio frequency signal. Merely for convenience of description, the instantaneous electric power is herein called a first electric power.

Further turning to FIG. 15, a second simulator has inverse input and output terminals 118 and 119 for receiving a distorted (radio frequency) pulse of a distorted pulse shape and for producing a distortionless (radio frequency) pulse of the original pulse shape, respectively, in the manner which will be described in the following. It is possible to understand that the second simulator is an inverse of the first simulator.

The second simulator comprises an overall square calculator 121 which is a counterpart of the square root calculator 116 (FIG. 14) and is responsive to the distorted pulse for supplying a subtractor 122 with a squared pulse which corresponds to the overall sum given by Equation (3). The subtractor 122 is for producing the first term of the righthand side of Equation (3) in the manner which will shortly be described. Responsive to the first term, a square root calculator 123 produces the samples $x_j$ of the distortionless pulse.

The second simulator further comprises a digital filter which is equivalent to that which is described in connection with FIG. 10 and is included in the first simulator. In the manner depicted in detail in FIG. 14, the digital filter comprises first through I-th delay units, inphase multipliers, and quadrature phase multipliers which are designated in FIG. 14 by the reference numerals 56 through 59, 91 through 94, and 96 through 99, respectively. The digital filter further comprises inphase and quadrature phase summation calculators which are separately depicted and are again designated by the reference numerals 111 and 112. In the second simulator, the inphase summation calculator 111 produces the second term on the righthand side of Equation (1). The quadrature phase summation calculator 112 produces the quadrature phase sum given by Equation (2).

A multiplier 125 is for calculating a product of the sample $x_j$ and the second term on the righthand side of Equation (1). Another multiplier 126 is for multiplying the product by two to supply an adder 127 with the second term on the righthand side of Equation (3). Supplied with the second term on the righthand side of Equation (1) from the inphase summation calculator 111, an inphase square calculator 128 supplies the adder 127 with the third term on the righthand side of Equation (3). The adder 127 supplies the subtractor 122 as a first subtrahend with a sum of the second and the third terms on the righthand side of Equation (3). Supplied with the quadrature phase sum of Equation (2) from the quadrature phase summation calculator 112, a quadrature phase square calculator 129 supplies the subtractor 122 as a second subtrahend with the fourth term on the righthand side of Equation (3). In the manner described above, the subtractor 122 produces the first term on the righthand side of Equation (3). It is now understood that the square root calculator 123 produces the sample $x_j$, which is delivered to the inverse output terminal 119.

Referring back to FIG. 13, the first and the second detected pulses of the detected pulse shape are delivered from the envelope detector 36 to an analog-to-digital (A/D) converter 131 operable by a sampling pulse sequence of a sampling interval. The analog-to-digital converter 131 produces the square root of each overall sum $u_j$ given by Equation (3), namely, the square root of the above-mentioned first electric power. A square calculator 132 corresponds to the square calculator 121 (FIG.15) and supplies a subtractor 133 with the overall sum $u_j$, namely, the first electric power. The subtractor 133 is for producing a difference electric power by subtracting an input electric power from the first electric power. The input electric power will shortly be described. The sampling pulse sequence may have a sampling frequency of about 700 kHz or higher.

Responsive to the difference electric power, a square root calculator 134 serves as a pulse estimating unit for estimating an estimated (radio frequency) pulse which is eventually shaped into the distortionless pulse and positioned at the correct pulse position to become the distortion cancelled pulse. The estimated pulse is delivered not only to the multipath canceller output terminal 44 but also to a linear predictor 135, inphase and quadrature phase component predictors or estimators 136 and 137, and an electric power calculator 139. The linear predictor 135 and the electric power calculator 139 will later be described.

Turning to FIG. 16, the inphase component predictor 136 is similar in structure to the second simulator and comprises first through I-th delay units and an inphase summation calculator which will be designated again by the reference numerals 56 through 59 and 111, respectively. It may be mentioned here that the second simulator provides the distortionless (radio frequency) pulse at the correct pulse position as the distortion cancelled (radio frequency) pulse if the inphase and the quadrature phase weighting factors $a_1$ through $a_I$ and $b_1$ through $b_I$ could optimally be decided in compliance with the undesired paths.

The first delay unit 56 is supplied with the estimated pulse from the square root calculator 134 (FIG. 13) which corresponds to the square root calculator 123 (FIG. 15). Each sample of the estimated pulse will be denoted by $x_j'$. The inphase component predictor 136 further comprises first through I-th controllable multipliers 141, 142, ..., and 144 supplied with first through I-th inphase provisional weighting factors $a_1'$, $a_2'$, ..., and $a_I'$ which are trained through learning identification to give the first through the I-th inphase weighting factors $a_1$ to $a_I$ optimally as will later be described. At any rate, the first through the I-th multipliers 141 to 144 produce first through I-th amplitude adjusted inphase pulses of the type described before. The inphase summation calculator 111 calculates a summation of the first through the I-th amplitude adjusted inphase pulses as a first estimated component $r_j$ which ultimately becomes the first distortion component and is given for the time being by:

$$r_j = \sum_{k=1}^{I} a_k' \cdot x_{j-k}'.$$

The quadrature phase component predictor 137 is similarly operable and is supplied with first through I-th quadrature phase provisional weighting factors $b_1'$, $b_2'$, ..., and $b_I'$. Responsive to the estimated pulse $x_j'$, the quadrature phase component predictor 137 produces a second estimated component which eventually becomes the second distortion component and is given for the present in accordance with:

$$s_j = \sum_{k=1}^{I} b_k' \cdot x_{j-k}'.$$

Turning back to FIG. 13 again, the first and the second estimated components $r_j$ and $s_j$ are delivered to the electric power calculator 139 together with the estimated pulse $x_j'$. An instantaneous electric power of a combination of the first and the second estimated components is calculated as a second electric power $q_j$ by the electric power calculator 139 in compliance with:

$$q_j = 2x_j' \cdot \sum_{k=1}^{I} a_k' \cdot x_{j-k}' + \left(\sum_{k=1}^{I} a_k' \cdot x_{j-k}'\right)^2 + \left(\sum_{k=1}^{I} b_k' \cdot x_{j-k}'\right)^2, \quad (4)$$

and is delivered to the subtractor 133 as the input electric power. It is possible to understand that the first electric power $u_j$ is given by Equation (3) wherein the estimated pulse $x_j'$ and the provisional weighting factors $a_1'$ through $a_I'$ and $b_1'$ through $b_I'$ are substituned for the sample $x_j$ of the distortionless pulse and the inphase and the quadrature phase weighting factors $a_1$ through $a_I$ and $b_1$ through $b_I$.

Responsive to the estimated pulse $x_j'$, the linear predictor 135 calculates a p-th order linear prediction coefficient and a normalized prediction residual electric power, both known in the art. The linear prediction coefficient is calculated by any one of the methods which are widely used in predicting the spectrum of a speech signal. An example is to resort to the autocorrelation coefficient. It is known that such a linear predictor is implemented either by a microprocessor or by a hardware circuit comprising filters. The normalized prediction residual electric power monotonously decreases until the order p of the linear prediction coefficient increases up to an ultimate order which corresponds to the frequency characteristics of the estimated pulse $x_j'$. The normalized predictions residual electric power hardly decreases when the order p reaches the ultimate order. Based on the fact, an order estimator 146 estimates the ultimate order. More specifically, the order estimator 146 monitors the normalized prediction residual electric power supplied from the linear predictor 135. When the normalized prediction residual electric power decreases to a substantial minimum, the linear prediction coefficient has the ultimate order.

Supplied with the normalized prediction residual electric power through the order estimator 146, a regulator 147 controls the first through the I-th inphase and quadrature phase provisional weighting factors $a_1'$ to $a_I'$ and $b_1$ to $b_I'$. The normalized prediction residual electric power substantially becomes a minimum when the estimated pulse $x_j'$ becomes coincident with the sample $x_j$ of the distortionless pulse. This is because the original pulse shape has the smoothest frequency characteristic as described with reference to FIG. 2. The provisional weighting factors $a_1'$ through $a_I'$ and $b_1'$ through $b_I'$ are therefore stepwise contolled by partial differentiation so as to be optimally decided as described in conjunction with FIG. 16. In other words, the first and the second estimated components are trained through learning identification so as to converge to the first and the second distortion components, respectively. As will readily be understood from the above, it is possible to use other quantities in training the first and the second estimated components. For example, it is possible to use the eigenvalue of a covariance matrix instead of the normalized prediction residual electric power.

While this invention has thus far been described in conjunction with a few preferred embodiments thereof, it will now be readily possible for one skilled in the art to carry this invention into effect in various other manners and to apply this invention to various fields other than the radio navigation system.

What is claimed is:

1. A multipath canceller responsive to each distorted pulse of a pulse modulated radio frequency signal received through a plurality of transmission paths comprising a shortest path and other undesired paths for cancelling a distortion to which an original radio frequency pulse of an original pulse shape is subjected before reception as said distorted pulse, said multipath canceller comprising:
   an envelope detector for envelope detecting said radio frequency signal to produce a detected pulse of a detected pulse shape in response to said distorted pulse;
   memory means for memorizing a distortionless pulse of a distortionless pulse shape;
   pulse position estimating means responsive to said detected and said distortionless pulses for estimating an estimated pulse position which said original radio frequency pulse has when received through said shortest path alone; and
   distortion cancelled pulse producing means responsive to said distortionless pulse and said estimated pulse position for producing at said estimated pulse position a distortion cancelled pulse which is exempted from said distortion.

2. A multipath canceller as claimed in claim 1, wherein said pulse position estimating means is responsive to said detected and said distortionless pulses for estimating said estimated pulse position by modifying said distortionless pulse into a plurality of modified pulses with different amplitudes and with different radio frequency phases with reference to said detected pulse, by carrying out vector addition of said modified pulses to produce composite pulses having composite pulse shapes, respectively, which approximate said detected pulse shape, and by selecting an earliest one of said composite pulses as representative of said estimated pulse position.

3. A multipath canceller as claimed in claim 2, wherein said distortionless pulse shape is identical with said original pulse shape.

4. A multipath canceller as claimed in claim 2, wherein said original pulse shape is different in duration from a standard pulse shape of a standard modulating pulse, and said memory means and said pulse position estimating means are included in a training circuit which additionally comprises:
   a pulse memory for memorizing said standard modulating pulse;
   error calculating means responsive to said detected pulse and each of said composite pulses for calculating an error therebetween;
   duration adjusting means responsive to said error for adjusting the duration of said standard pulse shape into an adjusted duration to produce an adjusted pulse of said adjusted duration; and
   means for storing said adjused pulse in said memory means as said distortionless pulse, said training circuit operable for making said error converge to zero.

5. A multipath canceller responsive to each distorted pulse in a succession of distorted pulses of a pulse amplitude modulated radio frequency signal received through a plurality of transmission paths comprising a shortest path and other undesired paths for cancelling a distortion to which an original radio frequency pulse of an original pulse shape is subjected before reception as said distorted pulse, said multipath canceller comprising:
   first means responsive to said distorted pulse for producing a distortionless pulse of a distortionless pulse shape which is similar to said original pulse shape; and
   second means responsive to said distorted and said distortionless pulses for producing a distortion cancelled pulse which is exempted from said distortion, wherein said second means comprises:
   a cross-correlator responsive to said distorted and said distortionless pulses for producing a cross-correlation coefficient therebetween;
   an autocorrelator responsive to said distortionless pulse for producing an autocorrelation coefficient thereof;
   pulse position estimating means responsive to said cross-correlation and said autocorrelation coefficients for estimating an estimated pulse position which said original radio frequency pulse has when received through said shortest path alone; and
   means responsive to said distortionless pulse and said estimated pulse position for producing said distortionless pulse at said estimated pulse position as said distortion cancelled pulse.

6. A multipath canceller as claimed in claim 5, wherein said original pulse shape comprising no sine components but cosine components and, wherein said second means comprises:
   a discrete Fourier transform circuit responsive to said distorted pulse for producing a discrete Fourier transform thereof;
   a zero-phasing circuit for frequency shifting said discrete Fourier transform to produce a frequency shifted transform which does not comprise said sine components but said cosine components; and
   an inverse direct Fourier transform circuit responsive to said frequency shifted transform for producing an inverse discrete Fourier transform thereof as said distortionless pulse.

7. A multipath canceller responsive to each distorted pulse in a succession of distorted pulses of a pulse amplitude modulated radio frequency signal received through a plurality of transmission paths comprising a shortest path and other undesired paths for cancelling a distortion to which an original radio frequency pulse of an original pulse shape is subjected before reception as said distorted pulse, said multipath canceller comprising:

first means responsive to said distorted pulse for producing a distortionless pulse of a distortionless pulse shape which is similar to said original pulse shape;

second means responsive to said distorted and said distortionless pulses for producing a distortion cancelled pulse which is exempted from said distortion; and said original radio frequency pulse being each of a first and a second original radio frequency pulse which share said original pulse shape, said distorted pulse being each of a first and a second distorted pulse which result in said pulse amplitude modulated radio frequency signal from said first and said second original radio frequency pulses, respectively, said undesired paths comprising near and distant paths, said distortion comprising a primary and a secondary distortion component, said primary distortion component formed in each of said first and second distorted pulses by a corresponding one of the first and the second original radio frequency pulses received through said near paths, said secondary distortion component formed in said second distorted pulse by the first original radio frequency pulse received through said distant paths, wherein said second means comprises:

third means responsive to said first distorted and said distortionless pulses for producing said primary distortion component and a first distortion cancelled pulse which corresponds to said first distorted pulse and is exempted from said primary distortion component; and fourth means responsive to said second distorted and said distortionless pulses and to the primary distortion component produced by said third means for producing a second distortion cancelled pulse which corresponds to said second distorted pulse and is exempted from said primary and said secondary distortion components.

8. A multipath canceller as claimed in claim 7, wherein:

said third means comprises:

a first cross-correlator responsive to said first distorted and said distortionless pulses for producing a first cross-correlation coefficient therebetween;

a first autocorrelator responsive to said distortionless pulse for producing a first autocorrelator coefficient thereof;

first primary means responsive to said first cross-correlation and autocorrelation coefficients for producing said primary distortion component and for estimating a first estimated pulse position which said first original radio frequency pulse has when received through said shortest path alone; and first secondary means responsive to said distortionless pulse and said first estimated pulse position for producing said distortionless pulse at said first estimated pulse position as said first distortion cancelled pulse;

said fourth means comprising:

a subtractor for subtracting the primary distortion component produced by said first primary means from said second distorted pulse to produce a preliminarily distortion cancelled pulse which corresponds to said second distorted pulse and is exempted from said primary distortion component;

a second cross-correlator responsive to said second distorted and said distortionless pulses for producing a second cross-correlation coefficient therebetween;

a second autocorrelator responsive to said distortionless pulse for producing a second autocorrelation coefficient thereof;

second primary means responsive to said second cross-correlation and autocorrelation coefficients for estimating a second estimated pulse position which said second original radio frequency pulse has when received through said shortest path alone; and second secondary means responsive to said distortionless pulse and said second estimated pulse position for producing said distortionless pulse at said second estimated pulse position as said second distortion cancelled pulse.

9. A multipath canceller responsive to a first and a second distorted pulse of a pulse amplitude modulated radio frequency signal received through a plurality of transmission paths comprising a shortest path, near paths, and distant paths for cancelling a distortion to which each of a first and a second original radio frequency pulse of a common original pulse shape is subjected before reception as each of said first and said second distorted pulses, the distortion of each of said first and said second distorted pulses comprising a primary distortion component, the distortion of said second distorted pulse further comprising a secondary distortion component, the primary distortion components of said first and said second distorted pulses being caused by reception through said near paths of said first and said second original radio frequency pulses, respectively, said secondary distortion component being caused by reception of said first original radio frequency pulse through said distant paths, said multipath canceller comprising:

processing means for processing said first and said second distorted pulses to produce a first and a second processed pulse in response to said first and said second distorted pulses, respectively;

distortionless pulse producing means responsive to said first processed pulse for producing a distortionless pulse of a distortionless pulse shape which is similar to said common original pulse shape;

first means responsive to said first processed and said distortionless pulses for producing said primary distortion component and a first distortion cancelled pulse which corresponds to said first processed pulse and is exempted from said primary distortion component; and second means responsive to said second processed and said distortionless pulses and to the primary distortion component produced by said first means for producing a second distortion cancelled pulse which corresponds to said second processed pulse and is exempted from said primary and said secondary distortion components.

10. A multipath canceller as claimed in claim 9, wherein said processing means comprises an envelope detector for envelope detecting said radio frequency signal to produce said first and said second processed pulses.

11. A multipath canceller as claimed in claim 9, wherein said processing means comprises:
an envelope detector for envelope detecting said radio frequency signal to produce a first and a second detected pulse in response to said first and said second distorted pulses, respectively; and
square calculators for squaring said first and said second detected pulses into said first and said second processed pulses, respectively.

12. A multipath canceller responsive to each distorted pulse of a pulse amplitude modulated radio frequency signal received through a plurality of transmission paths comprising a shortest path and other undesired paths for cancelling a distortion to which an original radio frequency pulse of an original pulse shape is subjected before reception as said distorted pulse, said distortion comprising a first and a second distortion component which are in an inphase and a quadrature phase relationship relative to the original radio frequency pulse received through said shortest path alone as a distortionless pulse, said original pulse shape having instantaneous amplitudes which are distributed substantially according to Gaussian distribution, said multipath canceller comprising:
first power calculating means responsive to said radio frequency signal for calculating an instantaneous electric power of said signal as a first electric power;
subtracting means for subtracting an input electric power from said first electric power to produce a difference electric power;
pulse estimating means responsive to said difference electric power for generating an estimated pulse;
component estimating means responsive to said estimated pulse for estimating a first and a second estimated component which correspond to said first and said second distortion components, respectively;
second power calculating means responsive to said estimated pulse and said first and said second estimated components for calculating an instantaneous electric power of a combination of said first and said second distortion components as a second electric power;
means for delivering said second electric power to said subtractor as said input electric power; and
training means responsive to said estimated pulse and coupled to said component estimating means for training said first and said second estimated components so as to make said estimated pulse converge to said distortionless pulse.

13. A multipath canceller as claimed in claim 12, wherein:
said component estimating means comprises:
a first digital filter responsive to said estimated pulse and first through I-th inphase factors for producing first through I-th amplitude adjusted inphase pulses, where I represents a predetermined integer;
an inphase summation calculator for calculating a summation of said amplitude adjusted inphase pulses as said first estimated component;
a second digital filter responsive to said estimated pulse and first through I-th quadrature phase factors for producing first through I-th amplitude adjusted quadrature phase pulses; and
a quadrature phase summation calculator for calculating a summation of said amplitude adjusted quadrature phase pulses as said second estimated component;
said training means comprising:
a linear predictor responsive to said estimated pulse for producing a linear prediction coefficient having an order and a normalized prediction residual electric power which monotonously decreases until said order increases up to an ultimate order; and
means responsive to said normalized prediction residual electric power and coupled to said first and said second digital filters for controlling said inphase and said quadrature phase factors so that said first and said second estimated components converge to said first and said second distortion components, respectively.

* * * * *